June 27, 1933. H. H. LINN 1,915,325
AUTOMOBILE TRAILER CONSTRUCTION
Filed Oct. 29, 1929 3 Sheets-Sheet 1
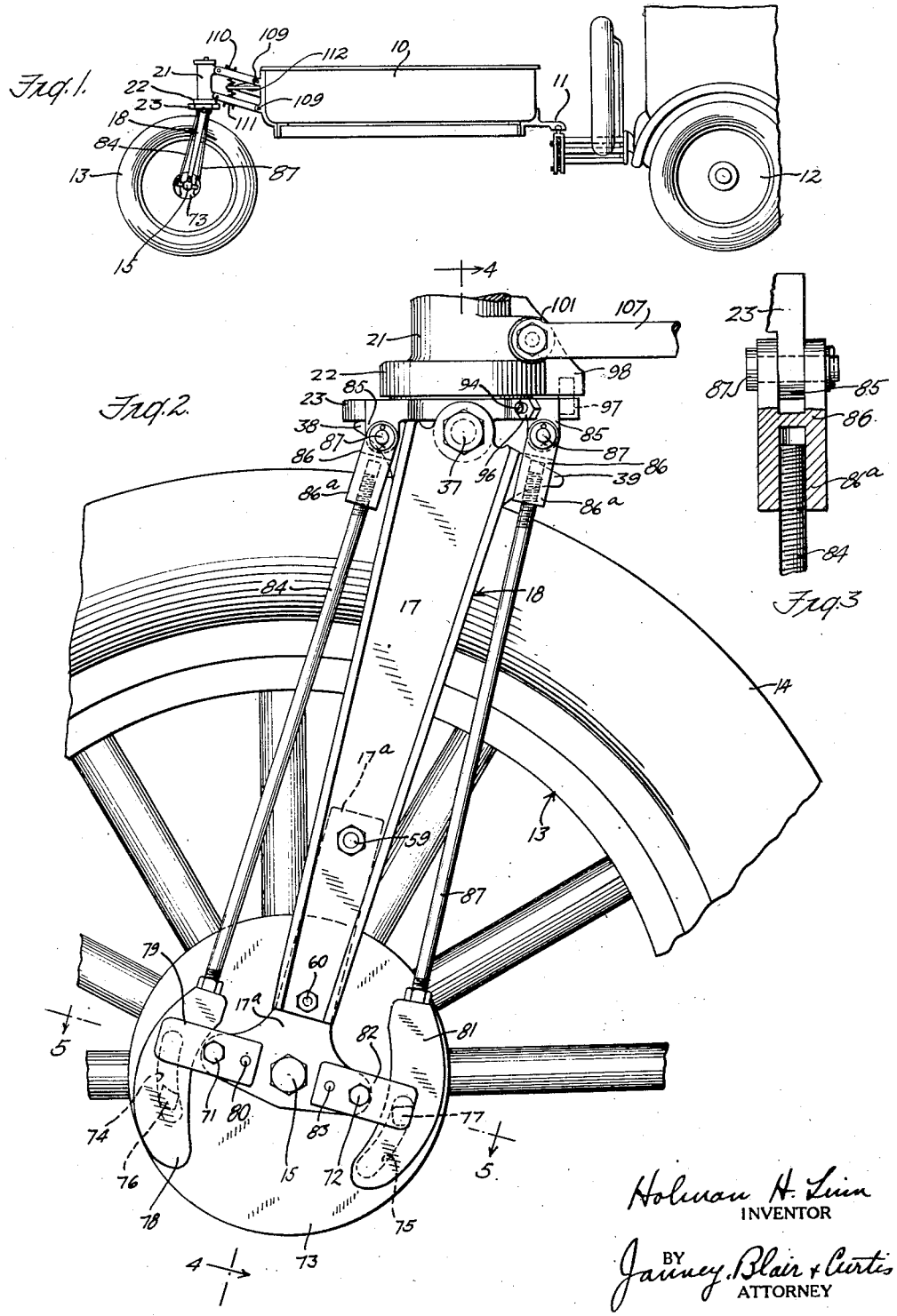

June 27, 1933. H. H. LINN 1,915,325
AUTOMOBILE TRAILER CONSTRUCTION
Filed Oct. 29, 1929 3 Sheets-Sheet 2

Holman H. Linn
INVENTOR

BY Janney, Blair & Curtis
ATTORNEY

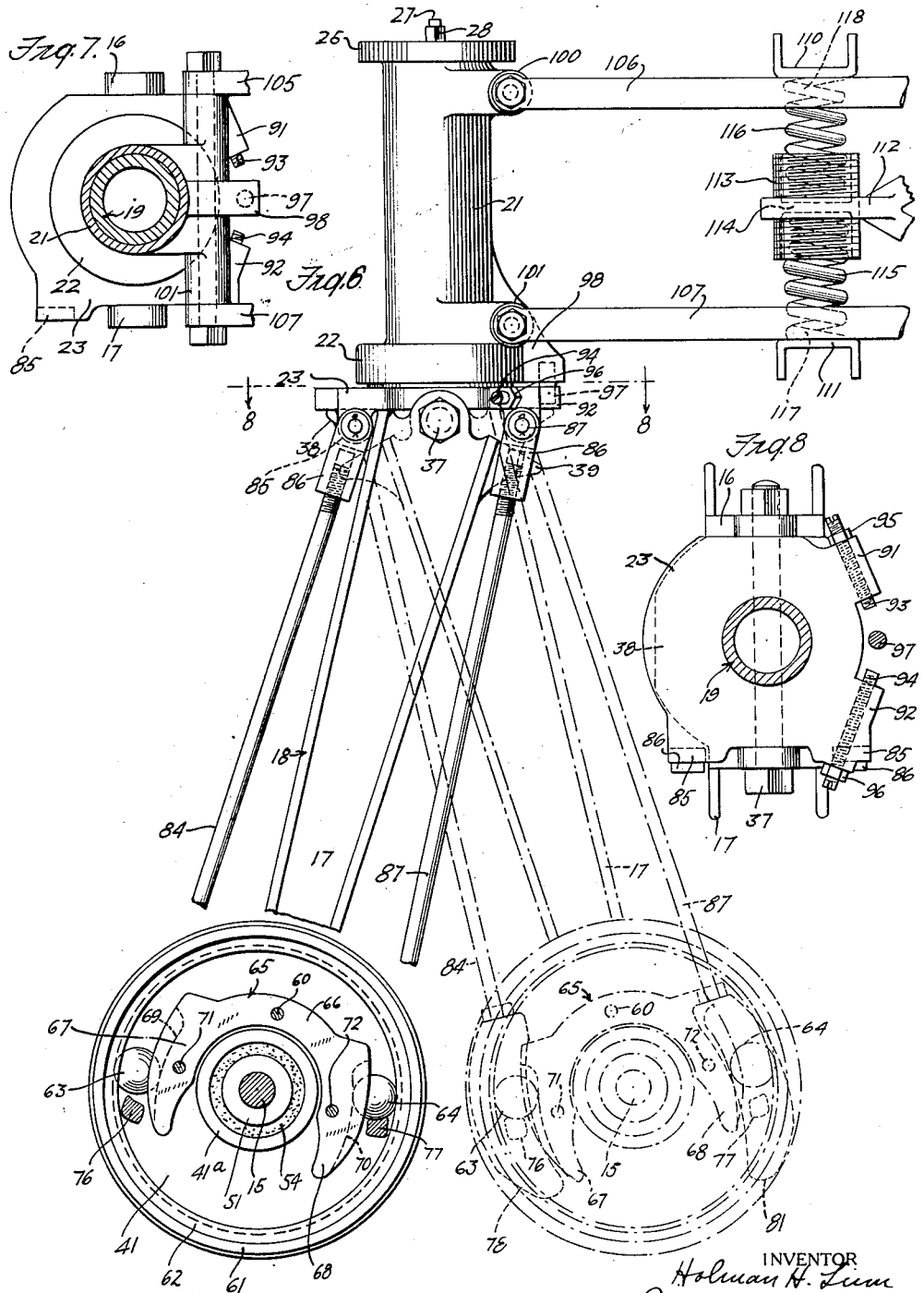

Patented June 27, 1933

1,915,325

UNITED STATES PATENT OFFICE

HOLMAN H. LINN, OF MORRIS, NEW YORK, ASSIGNOR TO LINN TRAILER CORPORATION, OF ONEONTA, NEW YORK, A CORPORATION OF NEW YORK

AUTOMOBILE TRAILER CONSTRUCTION

Application filed October 29, 1929. Serial No. 403,162.

This invention relates to vehicle construction and more particularly to the control and mounting of a vehicle wheel or wheels adapted to follow the directional changes of movement of the vehicle itself.

One of the objects of this invention is to provide a vehicle construction in which a supporting wheel or whees may be dependably made to follow directional changes of movement of the vehicle but without necessitating a 180° castering or complete turning-around of the wheel if the direction of movement of the vehicle is reversed. Another object is to provide a thoroughly practical, rugged and durable construction of the above-mentioned character and, moreover, one that will be of dependable and wholly automatic action under the varying conditions of practical use. Another object is to provide a caster wheel construction and mounting in which the various difficulties and disadvantages attendant upon effecting a complete turn-around of the caster wheel when the direction of movement of the vehicle is reversed, particularly under heavy loads, are overcome in a thoroughly practical manner. Another object of this invention is to provide a construction for trailers or like vehicles adapted to be hauled in which greater ease of control or manipulation of the hauled vehicle will be attained. Another object is to provide a trailer construction particularly adapted to be attached to and hauled or pushed by an automobile or tractor, for example, and in which the change of position of the caster wheel or wheels, resulting from reversal in direction of movement of the vehicle, may be achieved without subjecting the various parts of the apparatus to strains and particularly to torsional stresses. Another object is to provide a thoroughly practical, inexpensive and dependable caster wheel construction and mounting in which reversal of the direction of rotation of the wheel or wheels is made dependably effective to cause the wheel always to follow but without necessitating a complete turn-around of the wheel or wheels. Another object is to provide a construction of the above-mentioned character that will be well adapted to meet the widely varying conditions of hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown a preferred form of the various possible embodiments of my invention, Figure 1 is a side elevation, on a small scale, of a vehicle embodying my invention, Figure 1 showing the vehicle as a trailer attached to an automobile;

Figure 2 is a side elevation on an enlarged scale, of certain portions of the wheel mounting, in assembled relation, showing, like Figure 1, the position of certain of the parts when the vehicle or trailer is moved in a direction from the left to the right as viewed in Figures 1 or 2;

Figure 3 is an enlarged detail view, partly in section, of part of certain controlling linkages;

Figure 6 is a view like that of Figure 2 showing the interior construction and relation of certain of the wheel and fork-controlling mechanism, and illustrates also the change in the position of certain of the controlling parts when the direction of movement of the vehicle is reversed;

Figure 7 is a fragmentary plan view, as seen from the top of Figure 6, of the fork mounting and particularly illustrating the predeterminable limitation of the range of swing or castering of the wheel or wheels, and Figure 8 is a similar fragmentary plan view, as seen along the line 8—8 of Figure 6.

Similar reference characters refer to similar parts throughout the several views of the drawings.

Figure 4:
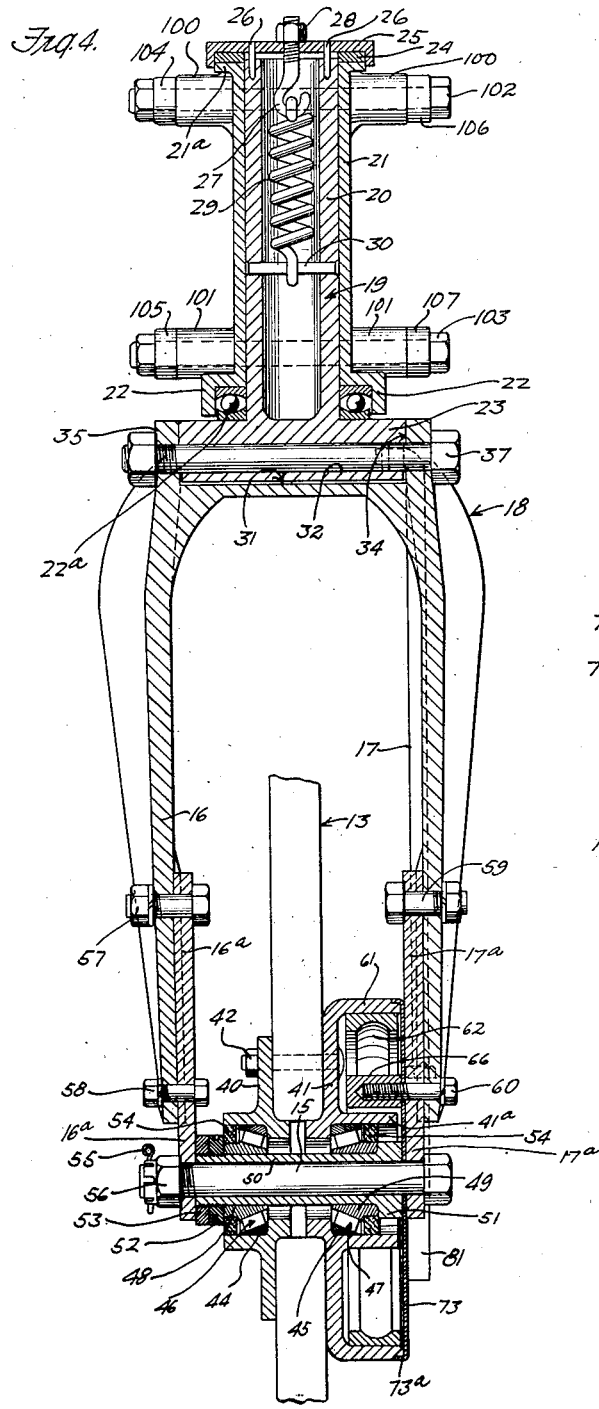
Figure 4 is a central sectional view, as seen along the line 4—4 of Figure 2.

Referring now to the drawings, and more particularly to Figure 1, there is shown at 10 a vehicle body which, it is to be understood, may be the body of a self-propelled vehicle or of a hauled or pushed vehicle and is illustratively shown as the body of a trailer, one end of which is secured, as at 11, to the rear or the forward end of an automobile 12, and the other or left hand end of which is supported by one or more wheels 13. The connection 11 of the vehicle body 10 to the propelled vehicle 12 is such that relative swinging movement between the two may freely take place about a horizontal axis, though relative swinging movement between the two vehicles about a vertical axis is prevented. Conveniently, two horizontally spaced connecting devices 11 may be employed to cause the vehicle 10 to follow directional changes in movement of translation of the propelled vehicle 12 itself.

As above noted, the left-hand end of the vehicle 10, as viewed in Figure 1, may be supported by one or more wheels 13 and where more than one wheel 13 is employed, it will be understood that they are horizontally spaced from each other. It will suffice, however, to describe in detail the construction and mounting of only one wheel since, where more than one wheel is employed, the construction and mounting of all of the wheels may be the same.

The wheel 13, referring now more particularly to Figures 2 and 4, may be and preferably is rubber-tired, as is indicated at 14, and is rotatably mounted, in a manner to be more fully described hereinafter, upon a stud shaft 15 carried by the lower ends of the arms 16—17 of a fork generally indicated at 18, the wheel being received between the arms 16 and 17 of the fork.

The fork 18 is carried by a trunnion generally indicated at 19, the trunnion 19 including a vertically extending cylindrical and preferably hollow post 20 mounted for rotation, preferably to a limited degree, in a housing 21 secured to the vehicle or body 10 (see Figure 1) by any suitable means, but preferably by a construction more clearly described hereinafter. Preferably the housing 21 is so supported that the axis of rotation of the trunnion 19 therein is substantially vertical. At its lower end the housing 21 is provided with a substantially circular or annular flange 22 (see Figs. 4, 6 and 2) within which is housed an anti-friction bearing 22ᵃ against the lower race of which a substantially circular and laterally directed extension 23 of the post 20 bears. The load on the vehicle is thus transmitted to the fork 18 and wheel through the bearing 22ᵃ, the latter facilitating the castering of the wheel and fork.

Preferably I provide a cap 25, as is better shown in Figure 4, closing and overlapping the upper end of the tube-like housing 21 and provided with pins 26 extending into the post 20 of the trunnion 19, so that any rotation of the trunnion 19 about a vertical axis will take with it the washer 25. A friction washer 24, preferably of a material like fiber, for example, is interposed between the cap 25 and the upper flanged face 21ᵃ of the housing 21. A hook 27 is carried by the cap 25 and preferably adjustably. Conveniently, the shank of the hook 27 is threaded and extends preferably centrally through the cap 25, carrying a nut 28 which prevents the hook 27 from being pulled downwardly through the cap 25. The lower end of the hook 27 secures one end of a spring 29 which extends downwardly into the hollow post 20 and has its lower end secured to the post 20, conveniently by being looped over a pin 30 that extends into or through the hollow post 20. The spring 29 is maintained under a suitable degree of tension so as to dependably hold the trunnion 19, and the parts carried thereby, in assembled relation with respect to the housing 21, and the tension spring 29 also compresses the washer 24 between the cap 25 and the flange 21ᵃ, thus insuring the maintenance of a suitable degree of frictional resistance to relative rotation between the housing and the trunnion.

The tension of the spring 29 may be varied at will as by manipulating the nut 28, thus to vary the length of the spring. By this means the degree of resistance to relative rotation between the housing and the trunnion may be predetermined at will. It will also be noted that the spring 29 and associated parts are entirely housed within the hollow post 20, the arrangement resulting in numerous advantages, among which may be noted compactness of construction and ease of assembly.

The fork 18 and the wheel 13 carried thereby will thus be seen to be supported to permit swinging of the fork and wheel about a substantially vertical axis; the fork, however, is so secured at its upper end to the trunnion 19 as will permit the fork and wheel to swing, to a limited extent, as is hereinafter fully explained, about a horizontal axis. The upper end of the fork 18 (see Figure 4) is shaped, as at 31, to receive a downwardly and transversely extending enlargement 32 of the flange 23, the latter being cut away at its opposed side portions, as at 33 and 34, to receive the upwardly directed ears 35 and 36 preferably integrally formed with the arms 16 and 17, respectively, of the fork 18. Through the ears 35 and 36 and through the portion 32 of the trunnion 19 there is passed a bolt 37 about the axis of which the fork 18 may swing relative to the trunnion 19, the latter in turn permitting the fork and wheel carried thereby to turn about a vertical axis The swinging movement of the fork 18 about the horizontal axis of the bolt 37 is, however, limited so as to permit the fork to swing to a limited extent to either side of a vertical plane passed through the axis of the bolt 37, as viewed in Figures 2 and 6. Preferably, the upper end portions of the arms 16 and 17 of the fork 18 are provided with horizontally extending lugs or extensions 38 and 39, as is better shown in Figures 2 and 6, either lug being adapted to bear against the under side of the disk-like flange portion 23 of the trunnion 19 and thus limit the swinging movement of the fork 18 and wheel carried thereby. Thus, in Figures 2 and 6, the fork 18 is shown swung to the left of the vertical plane through the axis of the bolt 37, being limited in this direction of swinging by the engagement of the lugs 38 on the under side of the portion 23 of the trunnion 19. In this position of the parts, the wheel is related to the vehicle 10 (Fig. 1) to trail and properly caster (as by swinging about the vertical axis of the trunnion 19) as changes in direction of movement of the vehicle take place as the latter moves in a direction toward the right, as viewed in Figure 1. Should the direction of movement of the vehicle 10 reverse, that is, should the vehicle move in a direction toward the left, as seen in Figure 1, the fork 18 and wheel 13 carried thereby are caused, by a preferred form of means to be more clearly described hereinafter, to swing to the other or right-hand side of the vertical plane through the bolt 37, as viewed in Figures 1, 2 or 6, and thus the fork 18 and its wheel are made to assume the position indicated in dotted lines in Figure 6. In this latter position the lugs 39 engage on the under side of the portion 23 of the trunnion and limit the swinging movement and ultimate position of the fork 18 in its position to the right of the vertical plane through the bolt 37. With the parts in this position, the wheel 13 is thus properly positioned to follow and faithfully caster in response to changes in direction of movement of the vehicle as the latter moves in a direction toward the left, as viewed in Figures 1, 2 or 6.

Considering now a preferred form of mechanism for controlling the position of the fork and wheel relative to the axis of the bolt 37, reference is first directed to Figure 4 of the drawings. As above noted, the wheel 13, which may be a spoked wheel or may be of any other suitable construction in this respect, is provided with hub members 40—41 between which, where the wheel is a spoked wheel, the spokes are clamped as by the bolts 42. The hub members 40—41 are each shaped to receive the outer races 44—45 of anti-friction bearings, preferably roller bearings, generally indicated, respectively, at 46 and 47. The inner races 48 and 49 of the bearings are received upon a quill 50, the inner race 49 of bearing 47 resting against a shoulder 51 of the quill, and the inner race 48 of the bearing 46 abutting against a nut 52 threaded upon the other end of the quill 50 and held in adjusted position by the lock nut 53. As is clearly shown in Figure 4, the outer races 44 and 45 of the two bearings abut against suitable shoulders formed upon the interior of the hub members 40—41. By means of the nut 52 the bearings are held in appropriate assembled relation with respect to the quill 50 and the hub members 40—41 of the wheel 13, suitable means, such as felt washers 54, closing off the roller bearings against ingress of foreign matter from the outside.

The quill 50 is carried by the bolt 15 between the head and nut of which the quill and extensions 16ª and 17ª, respectively, of the arms 16 and 17 are clamped, a cotter pin 55 holding the castellated nut 56 in clamping position. Thus, the quill 50 and the inner races of the roller bearings are held against rotation and the outer races and the wheel caused to rotate thereabout.

The extensions 16ª and 17ª of the fork arms 16 and 17 are preferably detachably secured thereto, the extension 16ª being secured by the bolt 57 and 58 and the extension 17ª being secured by the bolt 59 and the cap screw 60, the latter serving other functions and purposes, as is explained in detail below.

Figure 5:
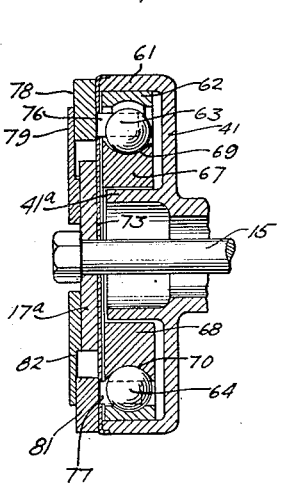
Figure 5 is a horizontal sectional view, as seen substantially along the line 5—5 of Figure 2.

The hub member 41 is shaped to provide a laterally directed cylindrical flange 61, as is clearly shown in Figures 4 and 5. The flange 61 has fitted therein a ball race 62, the latter being made of a suitable hardened material and provided with an inner peripheral raceway whose radius adapts it to coact with either of two balls 63—64 (see Figs. 5 and 6), these balls being positioned substantially diametrically opposite each other, as is better shown in Figure 6. Coacting with the balls 63 and 64 and the ball race 62 is what will be termed a cam member 65 better shown in Figure 6; this cam member 65 is in general shaped like an inverted U, as appears more clearly from Figure 6, and it rests within the housing formed by the hub member 41 and the two axially directed flanges 41ª and 61 (Fig. 4) thereof. The left-hand arm 67 of the cam member 65 extends downwardly but to the left of the flange 41ª, and the arm 68 extends downwardly to the right of the flange 41ª of the hub member 41. Arm 67 is shaped to provide a cam surface 69 (see Fig. 5) adapted to coact with the ball 63, and arm 68 has a cam surface 70 for coaction with the ball 64. These cam surfaces may be and preferably are portions of a circle whose center is eccentric of the axis of the ball race 62 and preferably is below the axis of the race 62, as these parts are viewed in Figure 6.

The cam member 65 is held against rotation preferably by being rigidly secured to the extension 17ª of the arm 17 of fork 18, and as is better shown in Figure 2, the lower end of the extension 17ª is provided with two opposed radially directed portions; through one of these a cap screw 71 passes into the arm 67 (Fig. 6) of the cam member 65, while a cap screw 72 passes through the other portion and into the arm 68 of the cam member 65. The cap screw 60 (Fig. 4) passes freely through the arm 17 and the extension 77ª and is threaded into the substantially horizontal connecting portion 66 (Fig. 6) of the cam member 65. Thus, the latter is securely fastened to the detachable extension 17ª of the fork arm 17 and, with respect to the wheel 13 and parts connected therewith, is held against rotation thereby.

The cam member 65, the race 62 and the balls 63 and 64 interposed therebetween, are protected against exposure and access thereto of foreign matter by means of a cover 73 preferably of a suitable sheet metal, flanged peripherally as at 73ª (Fig. 4), the flange 73ª fitting into a suitable rabbet provided in the flange 61 of the hub member 41. The cover 73 is interposed between the extension 17ª and the quill 50 as well as between the cam member 65 and the extension 17ª, being securely clamped therebetween by the bolt 15 and the cap screws 60, 71 and 72. These latter parts also hold the cover 73 against rotation, though free rotation of the flange 61 with respect thereto may take place.

The cover member 73 is provided with two slots 74 and 75 (Fig. 2), these slots being arcuate and having their centers preferably concentric with the axis or center of the rotating ball race 62. Slot 74 extends alongside of the space between the cam surface 69 (Fig. 6) and the ball race 62, while slot 75 extends alongside of the space between the cam surface 70 and the ball race 62. Extending through the slot 74 is a ball-controlling member 76 (Figs. 2, 6 and 5), this member extending into the space between the cam surface 69 and the raceway 62 and underneath the ball 63, as is better shown in Figures 6 and 5. A similar ball-controlling member 77 extends through the slot 75 into the space between the cam surface 70 and the raceway 62 and underneath the ball 64, as is clearly shown in Figure 6.

The ball-controlling member 76 is secured to or made integral with a plate-like member 78 (see Figs. 2 and 5) which rests flatwise against the exterior face of the cover 73 and is of sufficient extent to keep the slot 74 covered even though the member 78 is moved in a general vertical direction, as viewed in Figure 2, in order likewise to move the ball-controlling member 76. This plate-like member 78 is held snugly in slot-closing position by means of a flat spring member 79 (Figs. 2 and 5) which is conveniently clamped underneath the cap screw 71 and is held against rotation about the axis of the latter by means of a pin 80 extending into the extension 17ª of the fork arm 17.

A similar slot cover 81 is provided for the slot 75 and to this is attached or integrally formed therewith the ball-controlling member 77. A flat spring member 82 holds the plate-like cover 81 snugly against the outside face of the main cover 73, the spring 82 being clamped by the cap screw 72 and prevented from rotating by means of a pin 83 extending into the extension 17ª, as is clearly shown in Figure 2.

The member 78 (Fig. 2) has secured thereto an upwardly extending rod 84 pivotally connected to an ear 85 formed on the under side of the disk-like flange 23 of the trunnion 19. This connection is preferably effected by means of a yoke 86 (see Figs. 3 and 2) extending about the ear 85 and being pivotally connected thereto by means of a bolt 87. The rod 84 is threaded into the shank 86ª of the yoke 86. By disconnecting the yoke 86 from the ear 85, as by uncoupling the bolt 87, and by threading or unthreading the yoke 86, the effective length of the rod or link 84 may be suitably adjusted. A similar rod 87, suitably connected to the upper end of the movable cover member 81, is pivoted to an ear 88, on the under side of the trunnion member 23, by means of a yoke 89, the latter permitting adjustment of the effective length of the link or rod 87, as will be clear from Figure 3.

It will be noted that, by reason of the constructions above described, the pivotal connections of the controlling rods 84 and 87 (see Figure 2) pivot about axes that are displaced from the axis (of the bolt 37) about which the fork 18 may swing. Hence, when the parts are in the position shown in Figure 2, with the fork 18 swung to the left, and with the lug 38 in contact with the flange portion 23 of the trunnion 19, the rod 84 holds the ball-controlling member 76 in its lowermost position and hence adjacent the lower end of the slot 74 (see Fig. 2) while the rod 87 holds the ball-controlling member 77 in its uppermost position and hence adjacent the upper end of the slot 75, all with respect to a plane passed through the axis of the wheel 14 and extending at right angles to a line joining the axis 15 of the wheel and the axis 37 of the fork 18.

With the parts in the above described positions, the ball 63 is permitted to ride downwardly and be held in the space between the ball race 62 and the cam surface 61, this space gradually narrowing in a downward direction, as viewed in Figure 6, due to the shape of the cam surface 69. Preferably the member 76 which controls the ball 63 is moved far enough downwardly to be out of engagement with the ball 63, as is clearly shown in Figure 6. The relative uppermost position of the ball-controlling member 77, however, is effective to move and hold the ball 64 in a relatively uppermost position (see Figure 6) and hence to hold the ball in the relatively wider space between the upper portion of the cam surface 70 and the ball race 62. With the two balls thus positioned, free rotation of the wheel 14 in clockwise direction, as viewed in Figures 1, 2 and 6, may take place, the clockwise rotation of the wheel being effective to tend to lift the ball 63 in an upward direction while ball 64 is held ineffective in the relatively larger space, as above-mentioned. The wheel 14 may thus freely "caster" as long as the vehicle moves in a direction toward the right, as viewed in Figures 1, 2 or 6, freely pivoting about the substantially vertical axis of the portion 20 of the trunnion 19 (Fig. 4).

Should the direction of motion of the vehicle be reversed, as is the case where the vehicle is "backed up", as in turning a vehicle around, for example, the wheel 14 begins to rotate in counter-clockwise direction and the ball race 62 (see Fig. 6), instead of tending to lift the ball 63, now tends to roll the ball 63 in a downward direction, and hence into the narrowing space between the ball race 62 and the cam surface 69. Thus, the wheel 14 is locked against rotation in counter-clockwise direction.

The "backing" of the vehicle then proceeds but, the lower ends of the fork 18 being substantially anchored by the locked wheel 13, the wheel, and hence the axle 15 (Figs. 1, 2 and 6), remain substantially immovable, though the housing 21 and the trunnion carried thereby, attached to the vehicle 10, as above noted and as will be described in more detail hereinafter, accompany the "backing" movement of the vehicle, thus causing, relative to the housing 21 (Fig. 6), the swinging of the fork 18 and wheel carried thereby to the right-hand side of the axis of the bolt 37, moving the fork and associated apparatus into the dotted line position shown in Figure 6. During this movement the rods 84 and 87 bring about an ultimate reversal in relative positions of the ball-controlling members 76 and 77, and hence also of the balls 63 and 64, respectively, and hence into the position shown at the lower right-hand portion of Figure 6. The ball 63 has been raised relative to the cam surface 69 and is held in raised position by the member 76, and in that position it permits free rotation of the wheel, the ball 63 being thus held in the relatively wider space between the cam surface 69 and the race 62 adjacent the upper end of the cam surface 69. The ball 64, however, will have been permitted to roll downwardly with respect to the cam surface 70 and into the narrowing space between the cam surface 70 and the ball race 62 and in that position the ball 64 permits free rotation of the wheel and ball race 62 in counter-clockwise direction, as viewed in Figure 6, such rotation tending to roll or lift the ball 64 upwardly and out of jamming position. The wheel 13, being thus allowed to partake of free rotation in counter-clockwise direction, may, therefore, freely rotate in response to the "backing" or movement of the vehicle to the left (as viewed in Figs. 1 and 6) while the axis 15 of the wheel, now transposed to the right of the relatively vertical axis about which the trunnion 19 (Fig. 4) may swing, permits the wheel to "caster" or follow changes in direction to the right or left of this "backing" movement.

Subsequent stoppage of the vehicle followed again by a reversal in its direction of movement as by thereafter causing movement of the vehicle in a direction toward the right, as viewed in Figure 1, causes the ball 64 to lock the wheel against clockwise rotation whereupon the fork 18 swings from the dotted line position shown in Figure 6 to the full line position shown in Figures 6, 2 and 1, thus placing the wheel again in position to "caster" in response to changes in direction to the right or left of the path of forward movement of the vehicle.

It might at this point be noted that the holding of the wheel against rotation by one ball or the other, depending upon the direction in which the wheel tends to rotate when the direction of movement of the vehicle is reversed, continues until the fork 18 and wheel carried thereby are moved, relatively speaking, to or preferably well beyond the other side of the vertical axis about which the trunnion 19 (Fig. 4) pivots in the housing 21. With the preferred construction for braking or locking the wheel against rotation, this holding of the wheel against rotation may be achieved by appropriately shaping the cam surfaces 69 and 70 (Fig. 6) with respect to whatever movement is given the ball or balls by the ball-controlling members 76 and 77 as the fork and wheel are caused to pass through the transition from one castering position to the other.

Preferably, I limit the range of swing of the fork and wheel about the vertical axis of the trunnion 19 so as definitely to prevent a complete 180° turn-around of the trunnion, fork and wheel while permitting, however, a sufficient range of swinging movement of these parts to let the wheel caster adequately in response to changes in direction of continuous movement of the vehicle. Such limiting I prefer to achieve by the following preferred construction:—

The flange portion 23 of the trunnion 19 is cut away, as at 90 (Figs. 7 and 8) to provide an arcuate recess, the center of curvature of which is the axis of the portion 20 of the trunnion 19 (Fig. 4). At the ends of this cut away portion 90 I provide lugs 91 and 92 preferably formed integrally with the flange 23 and extending through these lugs and substantially tangentially to the otherwise circular flange 23 are the adjustable stop members 93 and 94, preferably in the form of screws threaded into and through the lugs 91 and 92, respectively, and held in adjusted position, as by the lock nuts 95 and 96. Extending downwardly through the flange 22 of the housing 21 (Fig. 6) into the cut away portion 90 and in the path of movement of the stop members 93 and 94 when the latter swing about the vertical axis of the trunnion 19, is a pin 97 (see also Fig. 7) that is anchored in the portion 22 and preferably, also, in a reenforcing rib 98 joining the cylindrical portion 21 of the housing with the laterally extending flange 22 thereof.

As the trunnion, fork and wheel swing about the vertical axis of the trunnion, as the wheel casters, the range of swing in both directions is limited by the engagement of the pin 97 with the stops 93 and 94, depending upon which direction the parts are swung. Thus, a complete 180° turn-around of the castering fork may be prevented, though it is to be understood that, in so far as certain features of my invention are concerned, I achieve excellent results without this feature whereby the swinging is limited.

The adjustment of the range of swing, as by appropriately positioning the stop members 93 and 94, is important since the extreme range of swing of the castering wheel, where the latter is employed on a trailer attached to an automobile, for example, varies with the wheel base and angle of turn of the steering wheels of the automobile, and by appropriate predetermination of the range of swing, by means of adjustable stop members 93—94, I may, therefore, readily suit the apparatus to the particular type, size or style of automobile, or like vehicle, to which the trailer may be attached.

It will be understood, also, all as hereinabove pointed out, that the fiber disk 24 (Fig. 4), interposed between the housing member 21ᵃ and the retaining cap 25 and compressed between these two members, by the spring 29, acts to brake or retard tendencies of the castering wheel to caster too freely. This feature, in conjunction with the limiting stops, thus makes possible a nicety and positiveness of castering action. These features, also, insure that the fork, when the wheel is locked upon the reversal in direction of movement of the vehicle, properly passes over to the other side of the vertical axis of the trunnion and that the fork does not swing around about the vertical axis of the trunnion 19 when such reversal in direction of movement of the vehicle takes place. Positive transition from one castering position to the other castering position is thus dependably assured.

As hereinabove noted, the housing 21 (see Figs. 1, 2 and 6) may be secured to the vehicle 10 in any suitable manner. I prefer, however, to employ a construction which coacts with the mechanisms hereinabove described for changing the wheel from one castering position to another, to achieve certain further unique advantages. The housing 21 is provided with two vertically spaced transversely extending extensions or lugs 100 and 101 (see Figs. 6 and 4) through which extend bolts 102 and 103, respectively, about the upper bolt 102 of which a link made up of the two link members 104 and 106 may pivot, and about the lower bolt 103 of which a link made up of the link members 105 and 107 may pivot. The link members extend to the right, as viewed in Figs. 6 and 1, and are pivotally secured to the vehicle body 10 as by the bolts 108 and 109 (Fig. 1). These links, moreover, will be seen to have their pivotal connections to the housing 21 and to the vehicle 10 so spaced vertically as to be maintained substantially parallel even though the housing 21 and vehicle body 10 move in a vertical direction relative to each other.

The upper link members 104 and 106 are rigidly connected by a channel-shaped member 110 (Fig. 6) and the lower link members 105 and 107 are rigidly interconnected by a cross-channel member 111, these cross-members being positioned preferably at the middle point of the links. A bracket 112 is secured to the vehicle body 10 and extends horizontally toward the housing 21 but substantially midway between the vertically spaced link members (see Figs. 1 and 6). Threaded into this bracket 112 is a sleeve 113 having a wall member 114 extending transversely through its interior, the wall member 114 (Fig. 6) being intermediate its upper and lower ends, thus forming two opposed cups. In the upper cup portion of the sleeve 113 there is received a spring 116, the upper end of which abuts against the cross-brace 110 and surrounds a downwardly projecting pin 118 associated with the member 110. Into the lower cup-shaped portion of the sleeve 113 there extends a spring 115, the lower end of which abuts against the lower cross-brace 111 and extends about a pin-like upward projection 117 associated with the latter. Thus, the springs 115 and 116 are dependably held in position. Both springs are under suitable compression and the bracket 112 is preferably so positioned, in a vertical direction with respect to the upper and lower links, that the load carried by the vehicle 10 is transmitted to the fork and wheel through the spring 115, the tension of the spring 115 being preferably such that the links occupy a substantially horizontal position when under load. Preferably, this relative position of the parts is achieved by adjustment of the sleeve 113 in a vertical direction relative to the bracket 112. Thus, by rotating the sleeve 113, it may be raised or lowered due to its threaded connection with the bracket 112 and thus the position of the adjacent ends of the two springs 115 and 116 may be correspondingly raised or lowered to meet the particular practical conditions. The spring 116 resists rebound tendencies that occur when the caster wheel travels over irregularities or bumps in the roadbed. Thus, the housing 21 is dependably held in proper relation to the vehicle body 10.

However, the spring and link suspension thus provided coacts to great advantage with the mechanism whereby the change in position of the wheel and fork from one castering position to the other castering position is brought about. Referring to Figure 6, for example, it will be noted that, when the fork and wheel swing from the left to the right, or vice versa, with respect to the housing 21, upon reversal in direction of movement of the vehicle, the transition is accompanied by a lifting of the housing 21, the latter being lifted to its highest point when the axis of the wheel is directly underneath the axis of the bolt 37. The spring and link suspension above decribed permit this lifting movement to take place without undue resistance to the transition of the fork and wheel from one side of the horizontal axis of the trunnion to the other, the spring 115 (Fig. 6) yielding somewhat during this action, and the pivoted links permitting relative vertical movement between the housing 21 and the vehicle to take place. Thus, the transition is effected yieldingly and without undue interference therewith or resistance thereto by the load transmitted from the vehicle body to the fork and wheel.

When it is desired to change a tire, I prefer to remove the wheel from the fork 18 and I prefer to achieve this by detaching the fork extensions 16ª and 17ª (Figs. 4 and 2) from their respective fork arms 16 and 17. This I accomplish by removing bolts 57, 58 and 59 (Fig. 4) and removing cap screw 60, whence the extensions 16ª and 17ª with the wheel and associated mechanism carried thereby may be slid apart from the fork arms 16 and 17, after detaching the control rods 84 and 87 from the ears 85 and 88 (Fig. 2), respectively. The tire may then be changed or other repair or replacement made, whence the parts may be again readily and quickly reassembled.

It will thus be seen that there has been provided in this invention an apparatus in which the several objects hereinabove described, as well as many thoroughly practical advantages, are successfully achieved. It will be seen that the apparatus is of a thoroughly practical nature, is of dependable action and control and well adapted to meet the varying conditions of hard practical use. More particularly, it will be noted that the avoidance of a complete 180° turn-around of the fork and caster wheel achieves many thoroughly desirable advantages among which may be noted that undue twisting or torsional strains, particularly where only one caster wheel is employed, are reliably minimized or entirely eliminated, due to the avoidance of the shifting of the point of support of the vehicle load with respect to the ground or roadbed.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In apparatus of the character described, in combination, a vehicle body or frame, a fork carrying a wheel, means securing said fork to said body adapted to permit said fork to pivot about a substantially vertical axis and about a substantially horizontal axis, means limiting the pivoting movement of said fork about said horizontal axis to such an extent as to permit said wheel to assume either of two castering positions, and means controlled by the position of said fork and wheel relative to said horizontal axis for permitting rotation of the wheel in castering direction while preventing rotation of the wheel in reverse direction.

2. In apparatus of the character described, in combination, a vehicle body or frame, a fork carrying a wheel, means securing said fork to said body adapted to permit said fork to pivot about a substantially vertical axis and about a substantially horizontal axis, means limiting the pivoting movement of said fork about said horizontal axis to such an extent as to permit said wheel to assume either of two castering positions, reversible means adapted to permit said wheel to rotate only in one direction, and means responsive to the position of said fork and wheel relative to said horizontal axis for reversing the action of said reversible means.

3. In apparatus of the character described, in combination, a vehicle body or frame, a device carrying a wheel, means securing said device to said body adapted to permit said device to pivot about a substantially vertical axis and about a substantially horizontal axis, means limiting the pivoting movement of said device about said horizontal axis to such an extent as to permit said wheel to assume either of two castering positions, a ball race rotatable with said wheel, a pair of balls coacting with said ball race, means connected with said device and between which and said race said balls are interposed, said means being shaped so that in one position relative thereto, one ball prevents rotation of said wheel in one direction and the other ball prevents rotation of the wheel in opposite direction, and means depending upon the position of said device with respect to a vertical plane passed through said horizontal axis for holding one ball out of said position and permitting the other ball to assume said position.

4. In apparatus of the character described, in combination, a vehicle body or frame, a device carrying a wheel, means securing said device to said body adapted to permit said device to pivot about a substantially vertical axis and about a substantially horizontal axis, means limiting the pivoting movement of said device about said horizontal axis to such an extent as to permit said wheel to assume either of two castering positions, a ball race rotatable with said wheel, a pair of balls coacting with said ball race, means connected with said device and between which and said race said balls are interposed, said means being shaped so that in one position relative thereto, one ball prevents rotation of said wheel in one direction and the other ball prevents rotation of the wheel in opposite direction, means forming an enclosure for said ball race and said balls and said coacting means, means passing through said enclosure for affecting the position of said balls, and means dependent upon the position of said device with respect to a substantially vertical plane through said horizontal axis for actuating said ball-controlling means.

5. In apparatus of the character described, in combination, a vehicle body or frame, a device carrying a wheel, means securing said device to said body adapted to permit said device to pivot about a substantially vertical axis and about a substantially horizontal axis, means limiting the pivoting movement of said device about said horizontal axis to such an extent as to permit said wheel to assume either of two castering positions, a ball race rotatable with said wheel, a pair of balls coacting with said ball race, means connected with said device and between which and said race said balls are interposed, said means being shaped so that in one position relative thereto, one ball prevents rotation of said wheel in one direction and the other ball prevents rotation of the wheel in opposite direction, means forming an enclosure for said ball race and said balls and said coacting means, said closure-forming means having a non-rotatable part provided with two slots, one adjacent each ball, separate means each covering one of said slots throughout its range of movement and each having a part extending through said slot, each part being adapted to control the position of one of said balls, and means responsive to the change in position of the axis of said wheel from one side of a vertical plane through said horizontal axis to the other for actuating said covering means.

6. In apparatus of the character described, in combination, a vehicle frame or body, means secured thereto for oscillation about a vertical axis and having a fork pivoted thereto for limited oscillation about a horizontal axis, a wheel carried by said fork, reversible mechanism for insuring rotation of said wheel in one direction only, and a member pivoted to said first-mentioned means but at a point displaced from the horizontal pivot of said fork for reversing said mechanism in accordance with the position of said fork and wheel to one side or the other of said horizontal axis.

7. In apparatus of the character described, in combination, a vehicle frame or body, a fork carrying a wheel, means pivoting said fork to said body for limited movement to either side of the horizontal axis of the pivot, and means for substantially locking said wheel against rotation upon movement of said vehicle in a direction toward that side of the vertical plane through said horizontal axis upon which the axis of the wheel happens to be while permitting rotation of the wheel in opposite direction.

8. In apparatus of the character described, in combination, a vehicle frame or body, a fork carrying a wheel, means pivoting said fork to said body for limited movement to either side of the horizontal axis of the pivot, means for substantially locking said wheel against rotation upon movement of said vehicle in a direction toward that side of the vertical plane through said horizontal axis upon which the axis of the wheel happens to be while permitting rotation of the wheel in opposite direction, and means permitting relative yielding in a vertical direction between said pivoting means and the vehicle body upon change in the position of said wheel and fork from one side of said vertical plane to the other.

9. In apparatus of the character described, in combination, a vehicle frame or body, a fork carrying a wheel, means pivoting said fork to said body for limited movement to either side of the horizontal axis of the pivot, means for substantially locking said wheel against rotation upon movement of said vehicle in a direction toward that side of the vertical plane through said horizontal axis upon which the axis of the wheel happens to be while permitting rotation of the wheel in opposite direction, and means for releasing said locking means only after said fork and wheel axis have moved from one side of said vertical plane to the other.

10. In apparatus of the character described, in combination, a vehicle frame or body, a device pivoted to said body to swing about a substantially vertical axis, a wheel, means connecting said wheel to said device adapted to permit the axis of said wheel to be displaced to a limited extent either to the rear or front of a vertical plane passed through the axis of said device, and means for substantially locking said wheel against rotation upon movement of said vehicle body in a direction toward that side of the said vertical plane upon which the axis of the wheel happens to be while permitting rotation of the wheel in opposite direction.

11. In apparatus of the character described, in combination, a vehicle frame or body, a device pivoted to said body to swing about a substantially vertical axis, a wheel, means connecting said wheel to said device adapted to permit the axis of said wheel to be displaced to a limited extent either to the rear or front of a vertical plane passed through the axis of said device, means for substantially locking said wheel against rotation upon movement of said vehicle body in a direction toward that side of the said vertical plane upon which the axis of the wheel happens to be while permitting rotation of the wheel in opposite direction, and means for limiting the swinging of said device and wheel about the substantially vertical axis of the former.

12. In apparatus of the character described, in combination, a vehicle frame or body, a device pivoted to said body to swing about a substantially vertical axis, a wheel, means connecting said wheel to said device adapted to permit the axis of said wheel to be displaced to a limited extent either to the rear or front of a vertical plane passed through the axis of said device, means for substantially locking said wheel against rotation upon movement of said vehicle body in a direction toward that side of the said vertical plane upon which the axis of the wheel happens to be while permitting rotation of the wheel in opposite direction, and means for retarding swinging movement of said device and wheel about the axis of the former.

13. In apparatus of the character described, in combination, a vehicle body or frame adapted to be attached at one end to another vehicle, means at the other end of the vehicle for supporting a wheel and means including a pair of parallel links for securing said wheel-supporting means to said body, rigid means projecting from said body and extending between said parallel links, a spring interposed between said projecting means and the upper of said links, a spring interposed between said projecting means and the lower of said links, and means adjustably positioned with respect to said projecting means for adjusting the adjacent ends of said springs relative to said projecting means.

14. In apparatus of the character described, in combination, a vehicle body or frame, a device carrying a wheel, means securing said device to said body adapted to permit said device to pivot about a substantially vertical axis and about a substantially horizontal axis, means limiting the pivoting movement of said device about said horizontal axis to such an extent as to permit said wheel to assume either of two castering positions, a ball race rotatable with said wheel, a pair of balls coacting with said ball race, means connected within said device and between which and said race said balls are interposed, said means being shaped so that in one position relative thereto, one ball prevents rotation of said wheel in one direction and the other ball prevents rotation of the wheel in opposite direction, a member for controlling the position of one ball, a member for controlling the position of the other ball, a rod pivoted to said securing means at a point displaced from said horizontal axis and connected to one of said controlling members, and a rod pivotally connected to said securing means at a point displaced from said horizontal axis and connected to the other of said controlling members.

15. In apparatus of the character described, in combination, a vehicle body or frame, a device carrying a wheel, means securing said device to said body adapted to permit said device to pivot about a substantially vertical axis and about a substantially horizontal axis, means limiting the pivoting movement of said device about said horizontal axis to such an extent as to permit said wheel to assume either of two castering positions, a ball race rotatable with said wheel, a pair of balls coacting with said ball race, means connected within said device and between which and said race said balls are interposed, said means being shaped so that in one position relative thereto, one ball prevents rotation of said wheel in one direction and the other ball prevents rotation of the wheel in opposite direction, a member for controlling the position of one ball, a member for controlling the position of the other ball, and means depending upon the position of said device with respect to a vertical plane passing through said horizontal axis for controlling said ball-controlling members.

16. In apparatus of the character described, in combination, a vehicle body or frame adapted to be attached at one end to another vehicle, means at the other end of the vehicle for supporting a wheel, and means including a pair of parallel links for securing said wheel-supporting means to said body, rigid means projecting from said body and extending between said parallel links, means carried by said projecting means and mounted to be adjustable in a vertical direction with respect thereto, a spring interposed between said last-mentioned means and the upper of said links, and a spring interposed between said last-mentioned means and the lower of said links.

17. In apparatus of the character described, in combination, a vehicle frame or body, a fork carrying a wheel, means pivoting said fork to said body for limited movement to either side of the horizontal axis of the pivot, and means responsive to movement of said vehicle in a direction toward that side of the vertical plane through said horizontal axis upon which the axis of the wheel happens to be for resisting rotation of the wheel.

18. In apparatus of the character described, in combination, a vehicle frame or body, a fork carrying a wheel, means pivoting said fork to said body for limited movement to either side of the horizontal axis of the pivot, means responsive to movement of said vehicle in a direction toward that side of the vertical plane through said horizontal axis upon which the axis of the wheel happens to be for resisting rotation of the wheel, means securing said pivoting means to said body and adapted to permit said pivoting means with the fork and wheel carried thereby to oscillate about a substantially vertical axis, and means yieldingly resisting oscillation of said securing means about said vertical axis.

19. In apparatus of the character described, in combination, a vehicle frame or body, a fork carrying a wheel, means pivoting said fork to said body for limiting movement to either side of the horizontal axis of the pivot, means responsive to movement of said vehicle in a direction toward that side of the vertical plane through said horizontal axis upon which the axis of the wheel happens to be for resisting rotation of the wheel, means securing said pivoting means to said body and adapted to permit said pivoting means with the fork and wheel carried thereby to oscillate about a substantially vertical axis, and means limiting the extent of oscillation of said securing means about said vertical axis.

20. In apparatus of the character described, in combination, a vehicle frame or body having bearing means whose axis is substantially vertical, a fork carrying a wheel and having a hollow post extending into said bearing means, the axis of the wheel being displaced from a vertical plane through the axis of said bearing means, a friction member interposed between a portion of said bearing means and a portion of said fork, and means tending to compress said friction means therebetween and including a spring under tension housed substantially within said hollow post.

21. In apparatus of the character described, in combination, a vehicle frame or body having bearing means whose axis extends substantially vertical, a trunnion having a substantially vertical post received within said bearing means and shaped at its lower end to provide substantially horizontally extending bearing means, a device carrying a wheel and supported by said horizontal bearing means, means limiting the range of swing of said device about said horizontal bearing means to either side of a vertical plane passed through the axis of said horizontal bearing means, and means responsive to movement of said vehicle in a direction toward that side of the vertical plane through the axis of said horizontal bearing means upon which the axis of the wheel happens to be for opposing rotation of said wheel.

22. In apparatus of the character described, in combination, a vehicle frame or body having bearing means whose axis extends substantially vertical, a trunnion having a substantially vertical post received within said bearing means and shaped at its lower end to provide substantially horizontally extending bearing means, a device carrying a wheel and supported by said horizontal bearing means, means limiting the range of swing of said device about said horizontal bearing means to either side of a vertical plane passed through the axis of said horizontal bearing means, means for limiting the range of oscillation of said trunnion about the vertical axis of said first-mentioned bearing means, and means responsive to movement of said vehicle in a direction toward that side of the vertical plane through the axis of said horizontal bearing means upon which the axis of the wheel happens to be for opposing rotation of said wheel.

23. In apparatus of the character described, in combination, a vehicle body or frame, a member carrying a wheel, means securing said member to said body adapted to permit said member to pivot about a substantially vertical axis and about a substantially horizontal axis, means limiting the pivoting movement of said member about said horizontal axis to such an extent as to permit said wheel to assume either of two castering positions, and means for substantially preventing rotation of said wheel upon movement of said vehicle in a direction toward that side of the vertical plane through said horizontal axis upon which the axis of the wheel happens to be while permitting rotation of the wheel in opposite direction.

In testimony whereof, I have signed my name to this specification this nineteenth day of October, 1929.

HOLMAN H. LINN.